US008532981B2

(12) United States Patent
Brun

(10) Patent No.: US 8,532,981 B2
(45) Date of Patent: Sep. 10, 2013

(54) CORPUS-BASED SYSTEM AND METHOD FOR ACQUIRING POLAR ADJECTIVES

(75) Inventor: Caroline Brun, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 198 days.

(21) Appl. No.: 13/052,686

(22) Filed: Mar. 21, 2011

(65) Prior Publication Data

US 2012/0245923 A1    Sep. 27, 2012

(51) Int. Cl.
*G06F 17/21*    (2006.01)

(52) U.S. Cl.
USPC .............................................. 704/10; 704/9

(58) Field of Classification Search
USPC ....................................................... 704/1–10
See application file for complete search history.

(56) References Cited

U.S. PATENT DOCUMENTS

| | | | |
|---|---|---|---|
| 7,058,567 B2 | 6/2006 | Aït-Mokhtar et al. | |
| 7,945,525 B2 * | 5/2011 | Ananthanarayanan et al. | 706/45 |
| 7,987,188 B2 * | 7/2011 | Neylon et al. | 707/739 |
| 2004/0158454 A1 | 8/2004 | Polanyi et al. | |
| 2008/0071519 A1 | 3/2008 | Brun | |
| 2008/0319978 A1 | 12/2008 | Brun et al. | |
| 2009/0077069 A1 | 3/2009 | Polanyi et al. | |
| 2009/0125371 A1 * | 5/2009 | Neylon et al. | 705/10 |
| 2009/0125805 A1 * | 5/2009 | Ananthanarayanan et al. | 715/255 |
| 2009/0204596 A1 | 8/2009 | Brun et al. | |
| 2009/0265304 A1 | 10/2009 | Aït-Mokhtar et al. | |
| 2010/0004925 A1 | 1/2010 | Ah-Pine et al. | |
| 2010/0082331 A1 | 4/2010 | Brun et al. | |
| 2011/0078157 A1 * | 3/2011 | Sun et al. | 707/749 |

OTHER PUBLICATIONS

Fahrni, A., & Klenner, M. (Apr. 2008). Old wine or warm beer: Target-specific sentiment analysis of adjectives. In Proceedings of the symposium on affective language in human and machine, AISB 2008 convention (pp. 60-63).*
Liu, J., & Seneff, S. (Aug. 2009). Review sentiment scoring via a parse-and-paraphrase paradigm. In Proceedings of the 2009 Conference on Empirical Methods in Natural Language Processing: vol. 1-vol. 1 (pp. 161-169). Association for Computational Linguistics.*
Liu, B. (2010). Sentiment analysis and subjectivity. Handbook of Natural Language Processing,, 627-666.*
Pang, B., Lee, L., & Vaithyanathan, S. (Jul. 2002). Thumbs up?: sentiment classification using machine learning techniques. In Proceedings of the ACL-02 conference on Empirical methods in natural language processing-vol. 10 (pp. 79-86). Association for Computational Linguistics.*

(Continued)

*Primary Examiner* — Douglas Godbold
*Assistant Examiner* — Ernest Estes
(74) *Attorney, Agent, or Firm* — Fay Sharpe LLP

(57) ABSTRACT

A system, method, and computer program product for generating a polar vocabulary are provided. The method includes extracting textual content from each review in a corpus of reviews. Each of the reviews includes an author's rating, e.g., of a specific product or service to which the textual content relates. A set of frequent nouns is identified from the textual content of the reviews. Adjectival terms are extracted from the textual content of the reviews. Each adjectival term is associated in the textual content with one of the frequent nouns. A polar vocabulary including at least some of the extracted adjectival terms is generated. A polarity measure is associated with each adjectival term in the vocabulary which is based on the ratings of those reviews from which the adjectival term was extracted.

23 Claims, 5 Drawing Sheets

(56) References Cited

OTHER PUBLICATIONS

Agarwal, A., & Bhattacharyya, P. (2006). Augmenting Wordnet with Polarity Information on Adjectives. In 3rd International Wordnet Conference.*

Aït-Mokhtar, et al., "Robustness beyond Shallowness: Incremental Dependency Parsing," Special Issue of NLE Journal (2002).

Agarwal, et al. "Augmenting Wordnet with Polarity Information on Adjectives," 3rd International Wordnet Conference, Jeju Island, Korea, South Jeju (Seogwipo), 2006.

Esuli, et al. SENTIWORDNET: A Publicly Available Lexical Resource for Opinion Mining, in 5th Conference on Language Resources and Evaluation (2006), pp. 417-422.

Pang, et al. "Thumbs up?: sentiment classification using machine learning techniques," in Proceedings of the ACL-02 conference on Empirical Methods in Natural Language Processing, vol. 10, 79-86, 2002.

Vegnaduzzo. "Acquisition of subjective adjectives with limited resources," in Proc. AAAI Spring Symposium on Exploring Attitude and Affect in Text: Theories and Applications, Stanford, US (2004).

Moghaddam, et al., "Opinion Digger: An Unsupervised Opinion Miner from Unstructured Product Reviews," in Proc. 19$^{th}$ Conf. on Information and Knowledge Management (CIKM10), Toronto, Oct. 2010.

U.S. Appl. No. 13/037,450, filed Mar. 1, 2011, Brun, et al.

Hu, et al. "Mining and Summarizing Customer Reviews," KDD'04, Aug. 22-25, 2004.

Kim, et al. "Determining the Sentiment of Opinions," Proceedings of the COLING conference, Geneva, 2004.

Mullen, et al. "Sentiment analysis using support vector machines with diverse information sources," in Proceedings of EMNLP 2004 (Jul. 2004), pp. 412-418.

Yu, et al. "Towards Answering Opinion Questions: Separating Facts from Opinions and Identifying the Polarity of Opinion Sentences," Proceedings of the 2003 Conference on Empirical Methods in Natural Language Processing, (EMNLP 2003). Sapporo, Japan. Jul. 11-12, 2003.

Brun, et al. "Normalization and paraphrasing using symbolic methods" ACL: Second International workshop on Paraphrasing, Paraphrase Acquisition and Applications, Sapporo, Japan, Jul. 7-12, 2003.

Aït-Mokhtar, et al., "Incremental Finite-State Parsing," in *Proc.* 5th Conf. on Applied Natural Language Processing (*ANLP'97*), pp. 72-79 (1997).

Aït-Mokhtar, et al., "Subject and Object Dependency Extraction Using Finite-State Transducers," in Proc. 35th Conf. of the Association for Computational Linguistics (*ACL'97*) Workshop on Information Extraction and the Building of Lexical Semantic Resources for NLP Applications, pp. 71-77 (1997).

Grefenstette. "Comparing Two Language Identification Schemes," Proc. 3rd Intern'l Conf. on the Statistical Analysis of Textual Data (*JADT'95*), Rome, Italy (1995).

* cited by examiner

ABSTRACT

CORPUS-BASED SYSTEM AND METHOD FOR ACQUIRING POLAR ADJECTIVES

CROSS REFERENCE TO RELATED PATENTS AND APPLICATIONS

Cross-reference is made to copending application Ser. No. 13/052,774 filed on Mar. 21, 2011, entitled CUSTOMER REVIEW AUTHORING ASSISTANT, by Caroline Brun, the disclosure of which is incorporated herein by reference, in its entirety.

BACKGROUND

The exemplary embodiment relates to opinion mining, and finds particular application in the context of the development of a natural language based opinion mining system.

Opinion mining refers to the determination of the attitude of a speaker or a writer with respect to some topic, written in natural language, using techniques involving natural language processing, computational linguistics, and text mining. Opinion mining is of particular interest to businesses seeking to obtain the opinions of customers and other reviewers on their products and services. Opinions are often expressed on social networks, blogs, e-forums, and in dedicated customer feedback pages of company websites.

Opinions are often expressed in natural language text using specific words, which can be considered as having a sentiment which is positive, i.e., indicating that the author has a good opinion of the item that he is writing about, or negative, i.e., that the author has a bad opinion. The words used can include adjectives (beautiful, ugly), verbs (love, hate), nouns (talent, nuisance), and sometimes adverbs (admirably, annoyingly). Each of these pairs includes a positive and a negative example. One problem in building an opinion mining system is the acquisition of a polar vocabulary, i.e., the vocabulary of positive and negative examples used to express positive and negative opinions. Words can have different meanings in different domains, thus a polar vocabulary can be ambiguous and differ from one applicative domain to another. For example, in the domain of movie reviews, the adjective "flat" is rather negative ("a flat scene") while it is generally neutral, or even positive, for example, in blogs related to diet ("a flat stomach").

It would be advantageous to be able to generate a polar vocabulary which is applicable to opinion mining in a particular domain.

INCORPORATION BY REFERENCE

The following references, the disclosures of which are incorporated herein in their entireties by reference, are mentioned.

The following disclose a parser for syntactically analyzing an input text string in which the parser applies a plurality of rules which describe syntactic properties of the language of the input text string: U.S. Pat. No 7,058,567, issued Jun. 6, 2006, entitled NATURAL LANGUAGE PARSER, by Aït-Mokhtar, et al., and Aït-Mokhtar, et al., "Robustness beyond Shallowness: Incremental Dependency Parsing," Special Issue of NLE Journal (2002); Aït-Mokhtar, et al., "Incremental Finite-State Parsing," in Proc. 5th Conf. on Applied Natural Language Processing (ANLP'97), pp. 72-79 (1997), and Aït-Mokhtar, et al., "Subject and Object Dependency Extraction Using Finite-State Transducers," in Proc. 35th Conf. of the Association for Computational Linguistics (ACL'97) Workshop on Information Extraction and the Building of Lexical Semantic Resources for NLP Applications, pp. 71-77 (1997).

Opinion mining is discussed, for example, in Moghaddam, et al., "Opinion Digger: An Unsupervised Opinion miner from Unstructured Product Reviews," in Proc. 19$^{th}$ Conf. on Information and Knowledge Management (CIKM'10) Toronto, October 2010; U.S. Pub. No. 2009/0265304, published Oct. 22, 2009, entitled METHOD AND SYSTEM FOR RETRIEVING STATEMENTS OF INFORMATION SOURCES AND ASSOCIATING A FACTUALITY ASSESSMENT TO THE STATEMENTS by Aït-Mokhtar, et al., and U.S. Pub. No. 2004/0158454, entitled SYSTEM AND METHOD FOR DYNAMICALLY DETERMINING THE ATTITUDE OF AN AUTHOR OF A NATURAL LANGUAGE DOCUMENT, by Livia Polanyi, et al.

The following relate generally to classifying adjectives and other words: *Augmenting Wordnet with Polarity Information on Adjectives.* Alekh Agarwal and Pushpak Bhattacharyaa. 3rd International Wordnet Conference, Jeju Island, Korea, South Jeju (Seogwipo) 2006; *SENTIWORDNET: A Publicly Available Lexical Resource for Opinion Mining.* In 5th Conference on Language Resources and Evaluation (2006), pp. 417-422; Vegnaduzzo, S. *Acquisition of subjective adjectives with limited resources.* In Proc. AAAI spring symposium on exploring attitude and affect in text: Theories and applications, Stanford, US (2004).

BRIEF DESCRIPTION

In accordance with one aspect of the exemplary embodiment, a method for generating a polar vocabulary includes extracting textual content from reviews in a corpus of reviews, each of the reviews including an author's rating. A set of frequent nouns from the textual content of the reviews is extracted. Adjectival terms are extracted from the textual content of the reviews, each adjectival term being associated in the textual content with one of the frequent nouns. A polar vocabulary including at least some of the extracted adjectival terms is generated. A polarity measure is associated with each adjectival term in the polar vocabulary which is based on the ratings of the reviews from which the adjectival term was extracted. At least part of the method may be performed with a computer processor.

In accordance with another aspect of the exemplary embodiment, a system for generating a polar vocabulary includes a parser which extracts textual content from reviews in a corpus of reviews, identifies nouns from the textual content of the reviews, from which a set of frequent nouns is identified, and extracts adjectival terms from the textual content of the reviews. The adjectival terms are extracted with a parser rule which identifies an adjectival term which is in a relation with one of the frequent nouns. A vocabulary generator generates a polar vocabulary comprising adjectival terms identified by the parser. A polarity measure is associated with each adjectival term in the vocabulary which is based on the ratings of the reviews from which the adjectival term was extracted. A processor implements the parser and vocabulary generator.

In accordance with another aspect of the exemplary embodiment, a method includes retrieving a corpus of reviews, each of the reviews including an author-generated rating of an item and textual content comprising the author's comments about the item. Based on the rating, each review is assigned to one of a set of sub-corpora. Frequent nouns are identified from the textual content of the reviews. A set of adjectival terms is extracted from the textual content of the reviews, each adjectival term being associated in the textual content with one of the frequent nouns. For each of the adjectival terms in the set, a measure of the occurrences of the adjectival term in each of the sub-corpora is computed. A polar vocabulary is generated which includes at least some of the extracted adjectival terms. A polarity measure is associated with each of the adjectival terms in the vocabulary which is based on the measure of occurrences of the term in each of the sub-corpora. At least part of the method may be performed with a computer processor.

DETAILED DESCRIPTION

The exemplary embodiment relates to a system and method for automatically or semi-automatically acquiring a polar vocabulary comprising polar adjectives. The polar vocabulary can be employed in a natural language-based opinion mining system and finds particular application in a system for checking coherency between an author's textual opinion on an item and a rating he has given for the item.

The exemplary method includes extracting polar adjectives from online review corpora. The method employs the structure of the reviews. In particular, it makes use of a reviewer's global ranking of a topic discussed as well as syntactic information extraction, frequency ordering and, optionally, post-filtering.

A "text element," as used herein, can comprise a word or group of words which together form a part of a generally longer text string, such as a sentence, in a natural language, such as English or French. In the case of ideographic languages, such as Japanese or Chinese, text elements may comprise one or more ideographic characters.

A "named entity" generally comprises a text element which identifies an entity by name and which belongs to a given semantic type. For example, named entities may include persons, organizations, locations, artifacts, specific dates, and monetary expressions. A "proper name," or proper noun, is a noun representing a unique entity, which has a unique referent in the world, as distinguished from common nouns which describe a class of entities. A proper name, as used herein, can be any text element which serves the function of a noun in a text string but which is not identified as being a common noun, for example, because it is capitalized and/or does not appear in a lexicon of common nouns, and is also not recognized as being a named entity.

A "lexical resource" can be any stored data structure which indexes text elements according to their meaning, and, in the exemplary embodiment, enables semantic types (or "contexts") of attributes and modifiers to be identified and associated with a sentiment for that context. The sentiment may be automatically generated, i.e., without user input, by natural language processing of a large corpus of text.

A "printer," as used herein, refers generally to any device which marks a print media substrate, such as paper, e.g., using inks, toners, or other colorants, and includes printing devices, fax machines, copiers, and multifunction devices with one or more of these functions.

Figure 1:
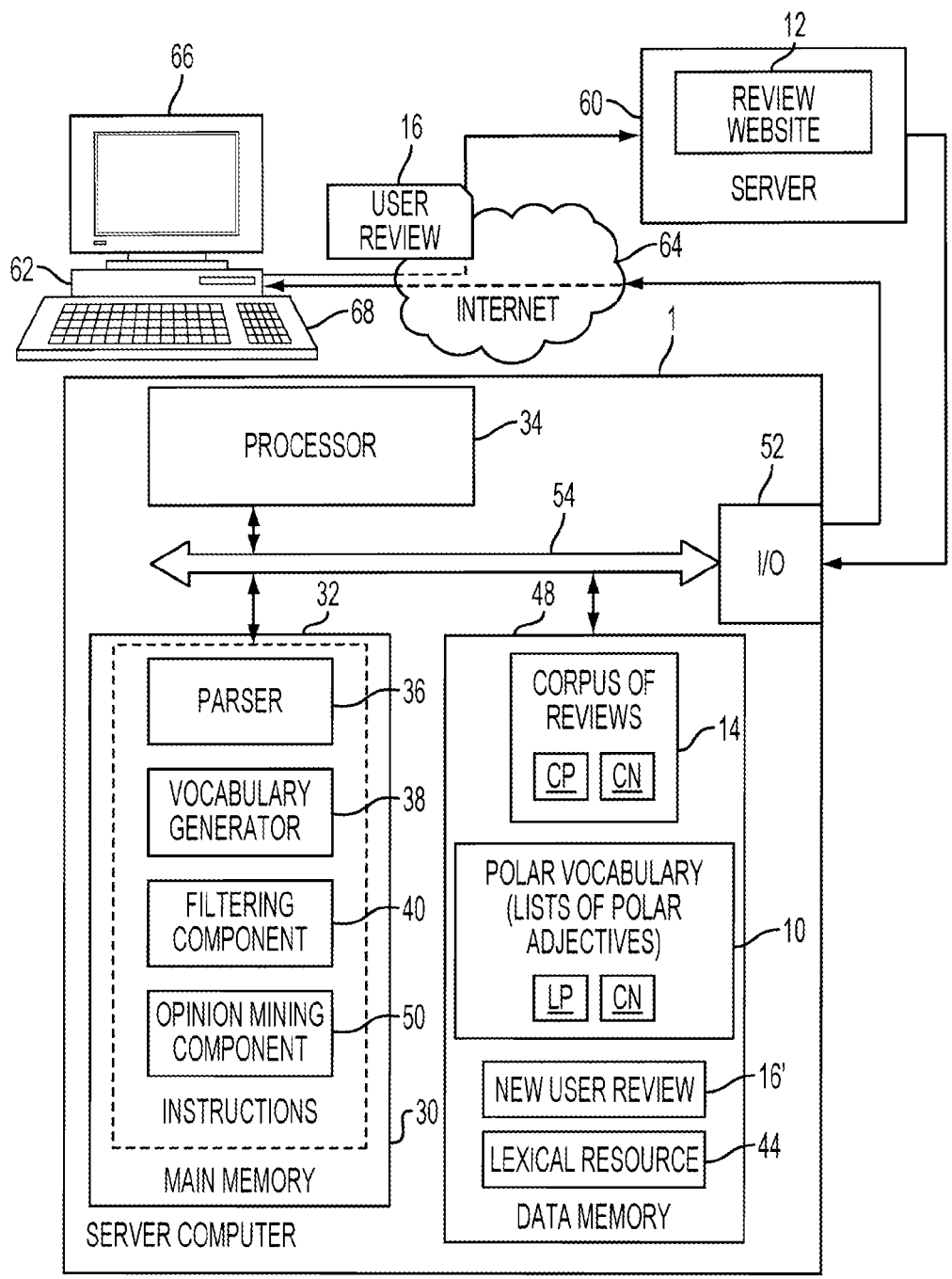
FIG. 1 is a functional block diagram of a system for acquiring a polar vocabulary.
Figure 2:
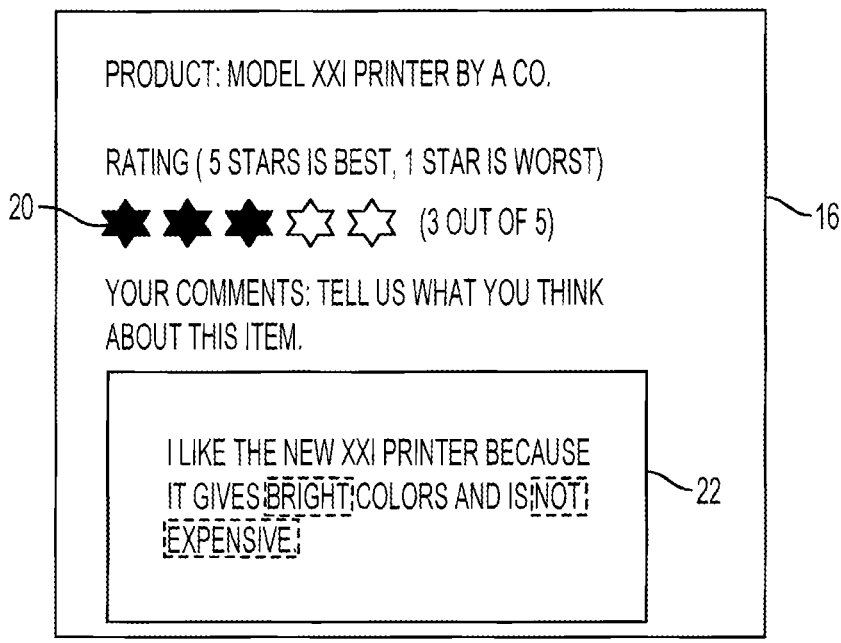
FIG. 2 is a simplified example of a review.

With reference to FIG. 1, an exemplary system 1 for generating a polar vocabulary 10 (primarily adjectives and adjectival phrases) is shown. The system includes a source 12 of a corpus 14 of structured user reviews 16. The system 1 generates the polar vocabulary 10 based on the structured reviews. As illustrated in FIG. 2, each review 16 in the corpus generally includes a rating 20 of an item being reviewed, such as a product or service, and an author's textual entry 22, in which the author provides one or more comments about the item (here, a printer model). The author can be any person generating a review, such as a customer, a user of a product or service, or the like.

The exact format of the reviews 16 may depend on the source 12. For example, independent review websites, such as epinion.com, fnac.com, and rottentomatoes.com, differ in structure. In general, however, reviewers are asked to put a global rating 20 associated with their written comments 22. Comments 22 are written in a natural language, such as English or French, and may include one or more sentences. The rating 20 can be a score, e.g., number of stars, a percentage, a ratio, or a selected one of a finite set of textual ratings, such as "good," "average," and "poor" or a yes/no answer to a question about the item, or the like, from which a discrete value can be obtained. For example, on some websites, people rank the products on a scale from 1 to 5 stars, 1 star synthesizing a very bad (negative) opinion, and 5 stars a very good (positive) one. On others, a global rating, such as 4/5, 9/10, is given. Ratings on a scale which may include both positive and negative values are also contemplated, for example, with +1 being the most positive and −1 being the most negative rating.

The exemplary system 1 assumes that negative vocabulary will statistically be more often present in reviews 16 having a low (negative) rating 20 and that positive vocabulary will be often more present in reviews 16 having a high (positive) rating 20.

The system 1 includes one or more computing device(s), such as the illustrated server computer 30. The computer includes main memory 32, which stores instructions for performing the exemplary methods disclosed herein, which are implemented by a processor 34. In particular, memory 32 stores a parser 36 for linguistically processing the text content 22 of the reviews, a vocabulary generator 38 for generating a candidate polar vocabulary, and a filtering component 40 for filtering the candidate polar vocabulary against one or more lexical resources 44. Together, components 36, 38, 40, operate to generate the polar vocabulary 10, which may be stored in data memory 48, together with the corpus 14 of reviews and optionally lexical resource 44. Instructions may also include an opinion mining component 50, which extracts an opinion from a new review 16' or any other input text using the polar vocabulary. Components 36, 38, 40, and 50, where present, may be separate or combined and may be in the form of hardware or, as illustrated, in a combination of hardware and software.

A network interface 52 allows the system 1 to communicate with external devices. Components 32, 34, 48, 52 of the system may communicate via a data/control bus 54.

The exemplary system 1 is shown as being located on a server computer 30 which is communicatively connected with a remote server 60 which hosts the review website 12 and/or with a remote client computing device 62, such as a PC, laptop, tablet computer, smartphone, or the like. However, it is to be appreciated that the system 1 may be physically located on any of the computing devices and/or may be distributed over two or more computing devices. The various computers 30, 60, 62 may be similarly configured in terms of hardware, e.g., with a processor and memory as for computer 30, and may communicate via wired or wireless links 64, such as a local area network or a wide area network, such as the Internet. For example, an author accesses the website 12 with a web browser on the client device 62 and uses a user input device, such as a keyboard, keypad, touch screen, or the like, to input a review 16, to the web site 12. During input, the review 16 is displayed to the user on a display device 66, such as a computer monitor or LCD screen, associated with the computer 62. Once the user is satisfied with the review, the user can submit it to the review website 12. The review website can be mined by the system 1 for collecting many such reviews to form the corpus 14.

The memory 32, 48 may represent any type of tangible computer readable medium such as random access memory (RAM), read only memory (ROM), magnetic disk or tape, optical disk, flash memory, or holographic memory. In one embodiment, the memory 32, 48 comprises a combination of random access memory and read only memory. In some embodiments, the processor 34 and memory 32 and/or 48 may be combined in a single chip. The network interface 52 may comprise a modulator/demodulator (MODEM).

The digital processor 34 can be variously embodied, such as by a single-core processor, a dual-core processor (or more generally by a multiple-core processor), a digital processor and cooperating math coprocessor, a digital controller, or the like. The digital processor 34, in addition to controlling the operation of the computer 30, executes instructions stored in memory 32 for performing the method outlined in FIG. 3 and/or FIG. 7.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 3:
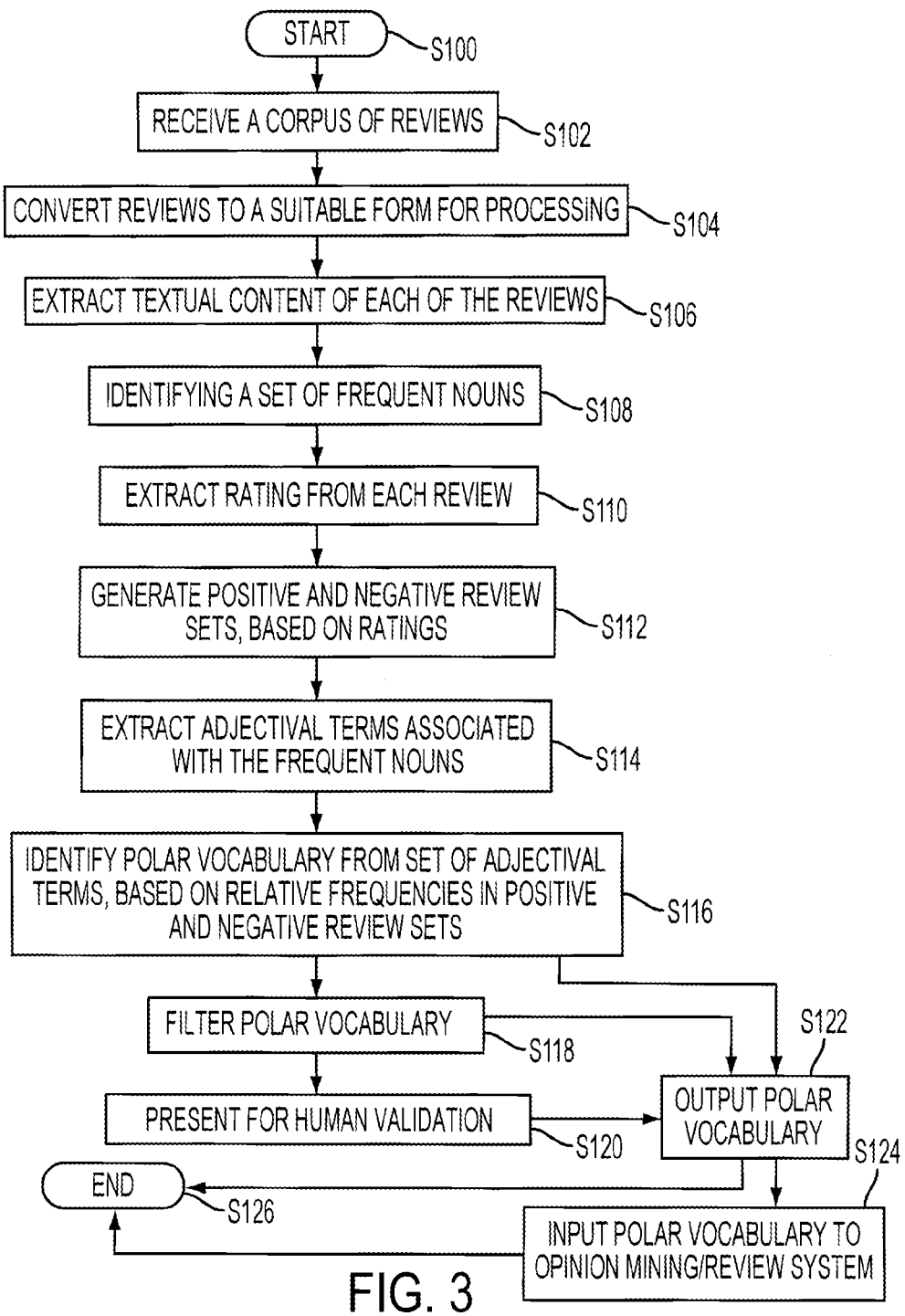
FIG. 3 is a flow diagram illustrating a method for acquiring a polar vocabulary in accordance with another aspect of the exemplary embodiment.

FIG. 3 illustrates a method which can be performed with the exemplary system shown in FIG. 1. The method begins at S100.

At S102, a corpus of reviews, e.g., in a specific domain, is collected and stored in memory.

At S104, the reviews may be converted to a suitable form for processing, e.g., into XML or other markup language.

At S106, textual content 22 of each of the reviews is extracted.

At S108, a set of the most frequent nouns in the corpus 14 ("frequent noun set") is identified by parsing the textual content 22 of the entire corpus.

At S110, from each of the reviews, a user rating 20 is extracted and stored in memory.

At 112, a plurality of sub-corpora is generated from the corpus 14, based on the user ratings. For example, positive and negative sets (sub-corpora) of reviews are generated. This may include assigning at least some of the reviews 16 in the corpus 14 to a positive corpus of reviews CP and others to a negative corpus of reviews CN, based on their user ratings 20.

At S114, in the text 22 of the positive and negative review sets CP, CN, adjectival terms comprising an adjective, such as adjectival phrases and single words, are identified which are in an identified relation with one the nouns in the frequent noun set.

At S116, based on a measure of occurrence of the adjectival terms in the positive and negative sets of reviews CP, CN, a candidate polar vocabulary is identified, where each term in the polar vocabulary is associated with a polarity measure (e.g., positive or negative, or a more fine-grained measure of polarity). In the exemplary embodiment, positive and negative sets of terms are generated.

At S118, the candidate polar vocabulary may be filtered to remove terms which are objective rather than polar and to remove/reclassify terms which have lexical information which suggests they may be wrongly classified in the positive or negative set.

At S120, the remaining candidate polar vocabulary may be presented to a human reviewer for review and validation.

At S122, the polar vocabulary may be output and stored in memory, either in the system or elsewhere.

At S124, the thus generated polar vocabulary may be input to an opinion mining system for use in evaluating new reviews or any other text.

The method ends at S126.

Various aspects of the system and method will now be described.

Generating the Corpus of Reviews

In the exemplary embodiment, reviews relating to only a single class of goods or services are selected to form the corpus 14 of reviews. In this way, the polar vocabulary 10 is domain specific. For example, for generating a polar vocabulary specific to printers, only those reviews expected to relate to printers may be included in the corpus. For example, reviews may be filtered using keywords and/or by using the structure of the opinion website, for example, to identify reviews relating to goods offered for sale by a predetermined set of known printer manufacturers. While printers are described as an example, other classes of goods and services are also contemplated.

In general, the corpus 14 used in the system and method includes a large number of reviews 16, such as at least 100 or 1000 or more reviews. The reviews are submitted by multiple different authors, each operating on a respective client device 62, although it is contemplated that some of the reviews may have been submitted by the same author and/or from the same client device.

The Parser

The parser 36 takes a text string, such as a sentence, paragraph, or even a sequence of a few words as input and breaks each sentence into a sequence of tokens (linguistic elements) and associates information with these. The parser 36 provides this functionality by applying a set of rules, called a grammar, dedicated to a particular natural language such as French, English, or Japanese. The grammar is written in a formal rule language, and describes the word or phrase configurations that the parser tries to recognize. The basic rule set used to parse basic documents in French, English, or Japanese is called the "core grammar." Through use of a graphical user interface, a grammarian can create new rules to add to such a core grammar. In some embodiments, the syntactic parser employs a variety of parsing techniques known as robust parsing, as disclosed for example in Salah Aït-Mokhtar, Jean-Pierre Chanod, and Claude Roux, "Robustness beyond shallowness: incremental dependency parsing," in special issue of the NLE Journal (2002); above-mentioned U.S. Pat. No. 7,058,567; and Caroline Brun and Caroline Hagège, "Normalization and paraphrasing using symbolic methods" ACL: Second International workshop on Paraphrasing, Paraphrase Acquisition and Applications, Sapporo, Japan, Jul. 7-12, 2003.

In one embodiment, the syntactic parser 36 may be based on the Xerox Incremental Parser (XIP), which may have been enriched with additional processing rules to facilitate the extraction of frequent nouns and adjectival terms associated with these and to filter out certain semantic classes of nouns and adjectives which are not generally relevant to polarity. Other natural language processing or parsing algorithms can alternatively be used.

The incremental parser 36 performs a pre-processing stage which handles tokenization, morphological analysis and part of speech (POS) tagging. Specifically, a preprocessing module of the parser breaks the input text into a sequence of tokens, each generally corresponding to a text element, such as a word, or punctuation. Parts of speech are identified for the text elements, such as noun, verb, etc. Some tokens may be assigned more than one part of speech, and may later be disambiguated, based on contextual information. The tokens are tagged with the identified parts of speech. Those identified as nouns are used to compute the most frequent nouns in the corpus (S108).

A surface syntactic analysis stage performed by the parser includes chunking the input text to identify groups of words, such as noun phrases and adjectival terms (attributes and modifiers). Then, syntactic relations are identified, such as a relationship between a subject and a modifier which modifies it or an object and an attribute which describes it.

Where reviews are expected to be in multiple languages, such as on a travel website, a language guesser (see, for example, in Gregory Grefenstette, "Comparing Two Language Identification Schemes," Proc. 3rd Intern'l Conf. on the Statistical Analysis of Textual Data (JADT'95), Rome, Italy (1995) and U.S. application Ser. No. 13/037,450, filed Mar. 1, 2011, entitled LINGUISTICALLY ENHANCED EMAIL DETECTOR, by Caroline Brun, et al., the disclosure of which is incorporated herein by reference in its entirety) may be used to detect the main language of the review 16 and an appropriate parser 36 for that language is then employed.

Extraction of Frequent Nouns

In order to detect the most discussed elements in the corpus, all nouns presents in the corpus are extracted, with the parser 36 (S108). Some of these may be filtered out, such as proper nouns, nouns relating to temporal expressions ("today," "yesterday," "December," etc.), unknown words, and urls or email addresses. This filtering may be achieved by putting constraints on the lexical semantic features provided by the parser and by using a named entity module to identify named entities. The named entity module may access a lexical resource to identify some of the named entities. Systems and methods for identifying named entities and proper nouns are disclosed, for example, in U.S. Pub. No. 20080071519, by Caroline Brun; U.S. Pub. Nos. 20080071519, 20080319978, 20090204596, and 20100082331, by Caroline Brun, et al.; and U.S. Pub. No. 20100004925, by Julien Ah-Pine, et al., the disclosures of which are incorporated herein by reference in their entireties.

The remaining nouns are then associated with their frequencies in the corpus. The frequency can be expressed as the number of occurrences divided by the total number of occurrences of the nouns extracted, expressed as a percentage.

A threshold on the frequency may be established to filter out less frequent nouns. For example, the list of nouns is filtered to include only those nouns with a frequency which is above a defined threshold, e.g., 0.1%, or to select, for example, the N nouns with the highest frequencies, where N may be, for example, at least 10, such as at least 50 nouns, or a combination of filtering methods may be employed.

In some embodiments, a human reviewer may review and validate the list of nouns, although this should not generally be needed in most domains.

Generation of Sets of Reviews (S112)

Two (or more) sets of reviews are identified, such as a set of positive reviews (positive review corpus) CP and a set of negative reviews (negative review corpus) CN. The classification of each review into a respective corpus may be based on the ratings 20. If the rating is a score or ratio, for example, the reviews in the positive set all have a more positive rating than the reviews in the negative set. Reviews with ratings which are inconclusive, i.e., neither very positive nor very negative, may be filtered out. For example, if the reviews are ranked from 1 to 5, only those ranked 5 may be included in the positive set and only those ranked 1 may be included in the negative set.

In other embodiments, the reviews may be classified based on a binary rating 20, such as an overall "positive" or "negative" rating given by the user in the review, where the review provides for this. In this case, a non-binary rating, such as a score or ratio, may be used to filter out inconclusive reviews.

In some cases, the review 16 may provide for partial ratings, i.e., a rating of one particular aspect of the item, such as ease of use, paper handling, and the like, in the case of a printer. These partial ratings may be used, in combination with, or as an alternative to, the rating 20 to provide the user rating used in identifying the two sets CP, CN.

Extraction of Adjectival Terms Associated with the Frequent Nouns (S114)

The parser is used to extract, from the positive and negative sets of reviews, modifiers and attributes that are in a (syntactic) relation which also includes one of the set of frequent nouns. For example, given the review:

User Rating: 1 star.
Review Summary: Do NOT buy this! Pros: None. Cons: Poor design, cheap construction, expensive cartridges.
and assuming that design, construction, and cartridges are all among the set of frequent nouns, the system extracts:
MODIFIER(poor, design)
MODIFIER(cheap, construction)
MODIFIER(expensive, cartridge)
In another example, given the review:
PrinterCo's ink system is great.
The system extracts:
ATTRIBUTE(system, great).
The parser 36 also detects negation. This information is taken into account since negation on polar adjectives has the property of inverting polarity.
For example, given the review:
Color printing is decent but not great.
the system extracts:
ATTRIBUTE(decent, printing)
ATTRIBUTE_NEG(great,printing).
The semantic properties of adjectives can be used in order to filter out adjectives which are not polar adjectives, but which can be considered as objective terms. For example, some of the adjectives are tagged by the parser 36 with a semantic class. Examples of classes of adjectives which may be filtered out in this way may include adjectives of color (e.g., grey printer), adjectives relating to time or age (e.g., old printer), adjectives relating to measures (large printer), and adjectives denoting a country (Japanese printer). The types of objective adjectives which are filtered out may, in some cases, be domain specific.

In some embodiments, the parser 36 may include a coreference module which identifies the noun which corresponds to a pronoun by examining the surrounding text. For example, given a review which states:

I just bought the XXI printer. It is excellent.

the pronoun "It" can be tagged by the coreference module of the parser to identify that it refers to the noun "printer," allowing extraction of the syntactic relation: MODIFIER(printer, excellent).

Identifying Polar Vocabulary from Adjectival Terms (S116)

The adjectives present in the relations extracted at S114 are used to generate two lists of polar adjectives based on a measure of each term's occurrence in the positive and negative review sets. This can be performed as follows:

A first list LP of candidate positive polar adjectives contains: a) all adjectives extracted from the positive corpus of reviews CP which are not negated and b) all adjectives extracted from the negative corpus of reviews CN which are negated; frequencies of the adjectives, as computed above, are provided.

A second list LN of candidate negative polar adjectives contains: c) all adjectives from the negative corpus of reviews CN which are not negated, and all adjectives from the positive corpus CP which are negated; frequencies of the adjectives, as computed above, are provided.

All adjectives that are present in LP and absent in LN can be added to LN with a frequency of 0.

All adjectives that are present in LN and absent in LP can be added to LP with a frequency of 0.

The two lists LP, LN thus can contain exactly the same adjectives, but in LP, frequencies are calculated relative to the positive sub corpus CP (and negation of the negative sub corpus CN), and in LN, frequencies are calculated relative to the "negative" sub corpus CN (and negation of the positive sub-corpus CP). Then, a distance (a scalar value) is associated with each adjective A of the list in the following manner:

$$\text{Dist}(A)=FP(A)-FN(A),$$

where FP is the frequency of the adjectival term in LP, i.e., $$FP(A) = \frac{\text{number of occurrences of the adjectival term } A \text{ in } CP \text{ and of its negated adjectival term } NA \text{ in } CN}{\text{total number of occurrences of adjectival terms in } LP},$$

and

FN is the frequency of the adjectival term in LN: i.e., $$FN(A) = \frac{\text{number of occurrences of the adjectival term } A \text{ in } CN \text{ and of its negated adjectival term } NA \text{ in } CP}{\text{total number of occurrences of adjectival terms in } CN}.$$

Thus, for example, if the adjective "terrible" occurs 200 times in the negative corpus, occurs 100 times in the positive corpus as "not terrible" or equivalent negation, and occurs 20 times in the positive corpus without negation, and the positive and negative corpuses have a total of 20,000 and 30,000 adjectival term occurrences, respectively, then the polarity measure of the term "terrible" can be computed as:

$$\frac{20}{20000} - \frac{200+100}{30000} = -0.009$$

As will be appreciated, other methods of computing the distance Dist(A) (a measure of polarity) of each adjectival term are contemplated, which are a function of the occurrences of each adjectival term in each corpus, taking into account negation. The distance Dist(A) reflects the difference of weight of an adjective between the positive corpus CP and in the negative corpus CN. A positive distance indicates that the adjective is associated, more frequently, with the positive corpus CP than with the negative corpus CN. A negative distance shows, the reverse, i.e., hat the adjective is associated, more frequently, with the negative corpus CN than with the positive corpus CP (a more important weight in the negative corpus).

The list of adjectives can then be reordered according to distance, from the most positive distance to the most negative distance.

This ordered list contains both highly positive and highly negative vocabulary as well as objective vocabulary (i.e., more neutral), which has a distance closer to zero.

Filtering the Candidate Polar Vocabulary (S118, S120)

Filtering of the list 10 may be performed automatically (S118) and/or manually (S120).

The objective vocabulary may be automatically filtered from the list (S118). In one embodiment, a threshold distance may be set on both the positive and negative side to filter out at least some objective vocabulary. For example, all terms with a Dist(A) of between +0.001 and −0.001 could be filtered out in the above example. In another embodiment, only the top N most positive and most negative terms, according to Dist(A) may be retained.

In another embodiment, a lexical resource 44 is used to filter out at least some of the objective vocabulary. The lexical resource can alternatively or additionally be used to correct any clearly erroneous assignments of adjectival terms to the lists (e.g., a clearly positive term with a negative distance, or vice versa). The lexical resource may provide information on the sentiment (e.g., selected from positive, negative, and objective) of words when used in one or more contexts. Some words have different sentiments depending on the context (such as flat stomach and flat scene) and for purposes of the exemplary embodiment, a global estimate of the sentiment may be computed, based on the scores for each of the contexts.

The lexical resource 44 can be a local resource stored in memory 48 and/or can be an online resource which is accessed by the system over the network 64. One exemplary lexical resource which can be used is SentiWordNet (see, Esuli Andrea, Sebastiani Fabrizio, "SENTIWORDNET: A Publicly Available Lexical Resource for Opinion Mining" in *5th Conference on Language Resources and Evaluation*, pp. 417-422 (2006)). SentiWordNet is a lexical resource dedicated to opinion mining. SentiWordNet assigns, to each synset of WordNet, three sentiment scores: positivity, negativity, objectivity. While SentiWordNet is a valuable resource in opinion mining, it is not suited to generating a polar vocabulary on its own since it lists every possible context in which a word can be used, and does not provide any indication as to how representative each context is of the global usage of that word. Moreover, since the contextual usage may differ by domain, this is not considered either.

In one embodiment, for each term A in the lists LP and LN, an average of the SentiWordNet positivity scores for all contexts of the word A is computed and an average of the negativity scores for all contexts of the word A is computed. The positivity and negativity scores are used to assess whether a word A is properly classed in the list LP or LN only when the average score is a clear indicator of positivity or negativity. For example, if the average positivity at least meets a predetermined threshold and the term A is in the negative list LN, the term A is considered to be incorrectly assigned to list LN, and may be moved to the positive list LP, and vice versa. Additionally, the objectivity scores for each of the contexts of the term A may be averaged to generate an objectivity score. A term A with an objectivity score which at least meets an objectivity threshold score may be removed from the list(s) LP, LN.

In some embodiments, rather than simply designating the terms in the list as positive or negative, they may each be assigned a strength value which is indicative of the relative positivity or negativity. The strength value can be based on the distance Dist(A) computed at S116. For example, the distance range is quantized to provide a set of two or more positive strength values and two or more negative strength values. These values may be associated with a textual description suitable for presenting to a user, such as a respective one of: very positive, quite positive, quite negative, and very negative. Each term on the list is then assigned a respective one of these classes, based on its computed distance. For example, if distances of −0.001 to −0.003 are labeled with a polarity measure of quite negative and values of −0.003 and more negative are labeled as very negative, the term "terrible," with a distance of −0.009 in the above example, would be labeled with a polarity measure of very negative. In other embodiments, the terms in the polar vocabulary are manually assigned to one of these polarity groups and/or accorded a numerical strength value.

In some embodiments, the list 10 of polar vocabulary and associated polarity measure may be presented to a human reviewer (S120). In this embodiment, the human reviewer reviews the list and may either validate it without changes or modify it, e.g., to add/remove one or more terms and/or to adjust their polarity.

Storing the List

The optionally filtered list 10 of polar vocabulary thus generated may be stored in memory of the computer 30 or output to an external device. Each adjectival term in the list may be tagged with a measure of polarity, such as positive or negative polarity, its strength value, and/or Dist(A). The polar vocabulary 10 may thus include a large number of adjectival terms, such as at least ten or at least 100 adjectival terms, each associated with a respective polarity measure.

Opinion Mining

The exemplary lists LP and LN of polar adjectives can be input to an opinion mining/opinion review system (S122). Opinion mining aims to determine the attitude of an author, with respect to some topic, of text (written or spoken) in natural language. The information can be used on target corpora such as social networks, blogs, e-forums and the like, to extract customer opinions on products and services. A specific example of an opinion mining component 50 can serve as a component of an authoring assistant, as disclosed, for example, in above-mentioned application Ser. No. 13/052, 774, filed contemporaneously herewith, entitled CUSTOMER REVIEW AUTHORING ASSISTANT, by Caroline Brun. The authoring assistant disclosed in that application enables the user to modify a review to reduce the inconsistency between the review and the author's rating.

In an opinion mining system, once the polar vocabulary 10 has been built, the vocabulary generator 38, filtering component 40, and corpus 14 shown in FIG. 1 are no longer needed and thus can be omitted from system 1. While the opinion mining system may use the polar vocabulary 10 identified by the method shown in FIG. 3, in the exemplary embodiment, a polar lexicon may include some or all of the polar vocabulary 10 and/or may be generated, in whole or in part, by other methods. The expression "polar lexicon" is used simply for convenience to indicate a polar vocabulary which may include additional/alternative terms to those in polar vocabulary 10. For example, polar lexicon may include polar vocabulary 10 and one or more of polar nouns, verbs, adverbs, etc. The polar lexicon may thus include a large number of polar terms, such as at least ten or at least 100 or 1000 polar terms, or more, each polar term being associated, in memory, with a respective polarity measure (e.g., selected from positive/negative, polar/non polar, a strength value, or a distance based on relative frequencies of occurrence in two or more rating-based sub-corpora).

The opinion mining system may take as input text of any kind and identify instances of sentiment in the text.

The text input is parsed by parser 36 (or a similar parser), but using a specific set of rules for extracting sentiment. These rules can include rules for extracting semantic relations (denoting an association between two text elements in a sentence) which are indicative of positive or negative opinions ("opinion expressions"). In general, an opinion expression can be any relation extracted by the parser 36 in which at least one of first and second text elements in the relation includes one of the terms in the polar lexicon. The relation extraction rule can optionally subject to one or more constraints, such as a constraint regarding the other text element in the relation.

Some of the parser rules for extracting opinion expressions rely on the polar vocabulary 10. In the exemplary embodiment, the rules rely on the entire polar lexicon. As will be appreciated, while a full rule-based parser, such as the XIP parser, is exemplified, more simplified systems for analyzing the text to identify opinion expressions are also contemplated, which for convenience, are referred to herein as parsers 36.

The opinion mining system 50 uses a parser 36 substantially as described above for the system 1, but which includes specific rules for extracting sentiment (polarity). In particular, the parser is used to detect semantic relations from the input text which express a sentiment and to attach a polarity measure to the sentiment. Dedicated semantic rules for detection of sentiment may be built on top of the general (English) grammar of the parser 36, which are combined with lexical information encoding the polar vocabulary 10, or, more generally, the polar lexicon.

Some of the opinion expressions (sentiment relations) extracted are those which include, as one of the elements in the relation, an adjective which is in the polar vocabulary 10. The polar vocabulary 10/polar lexicon can be incorporated directly into the parser rules and need not be stored separately. For example some parser rules relevant to polar vocabulary 10 could be of the form:

Extract MODIFIER(noun X, modifier Y) and POLARITY(Y)

Generate SENTIMENT[POLARITY](X,Y)

or

If Extract (noun X, modifier Y) and POLARITY(Y)

Then Generate SENTIMENT[POLARITY](X,Y)

or

Extract ATTRIBUTE(noun X, attribute Y) and POLARITY(Y)

Generate SENTIMENT[POLARITY](X,Y)

where X can be any noun or may be limited to certain classes of noun, and/or to a list of nouns, as for the frequent nouns, Y can be any adjectival term in the list 10 of polar adjectives, and POLARITY is the polarity measure with which Y is tagged (e.g., positive or negative). As will be appreciated, further constraints may be placed on these rules. For instances of negation, similar rules may be provided:

If Extract MODIFIER_NEG(noun X, modifier Y) and POLARITY(Y), or

Then Generate SENTIMENT[REVPOLARITY](X,Y), or

If Extract ATTRIBUTE_NEG(noun X, attribute Y) and POLARITY(Y)

Then Generate SENTIMENT[REVPOLARITY](X,Y), where REVPOLARITY is the reverse polarity with which Y is tagged (e.g., from positive to negative) when negation is identified.

Some of the opinion mining rules may relate to nouns, pronouns, verbs, and adverbs which are in the polar lexicon. These words and the rules which employ them may have been developed manually and/or through automated methods. Other methods for extracting sentiment which may be used in the method, are described, for example, in the references mentioned above, the disclosures of which are incorporated herein by reference.

For example rules relating to verbs might be of the form:

If Extract SUBJECT(verb X, noun Y) and POLARITY(X)

Then Generate SENTIMENT[POLARITY](X,Y)

or,

If Extract OBJECT(verb X, noun Y) and POLARITY(X)

Then Generate SENTIMENT[POLARITY](X,Y)

where Y can be any noun and X can be a verb of polarity measure POLARITY.

In case of negation of the verb, similar rules can be provided:

If Extract SUBJECT_NEG(verb X, noun Y) and POLARITY(X)

Then Generate SENTIMENT[REVPOLARITY](X,Y)

or,

If Extract OBJECT_NEG(verb X, noun Y) and POLARITY(X)

Then Generate SENTIMENT[REVPOLARITY](X,Y)

where REVPOLARITY is the reverse polarity with which X is tagged (e.g., from positive to negative) when negation is identified.

When a rule identifies a semantic relation in the text which includes a term in the polar vocabulary/lexicon, it is flagged with the appropriate polarity, taking into account negation, as discussed above, which reverses the polarity.

The instances identified may be displayed to a user, tagged, output, or otherwise processed by the opinion mining system.

Figure 5:
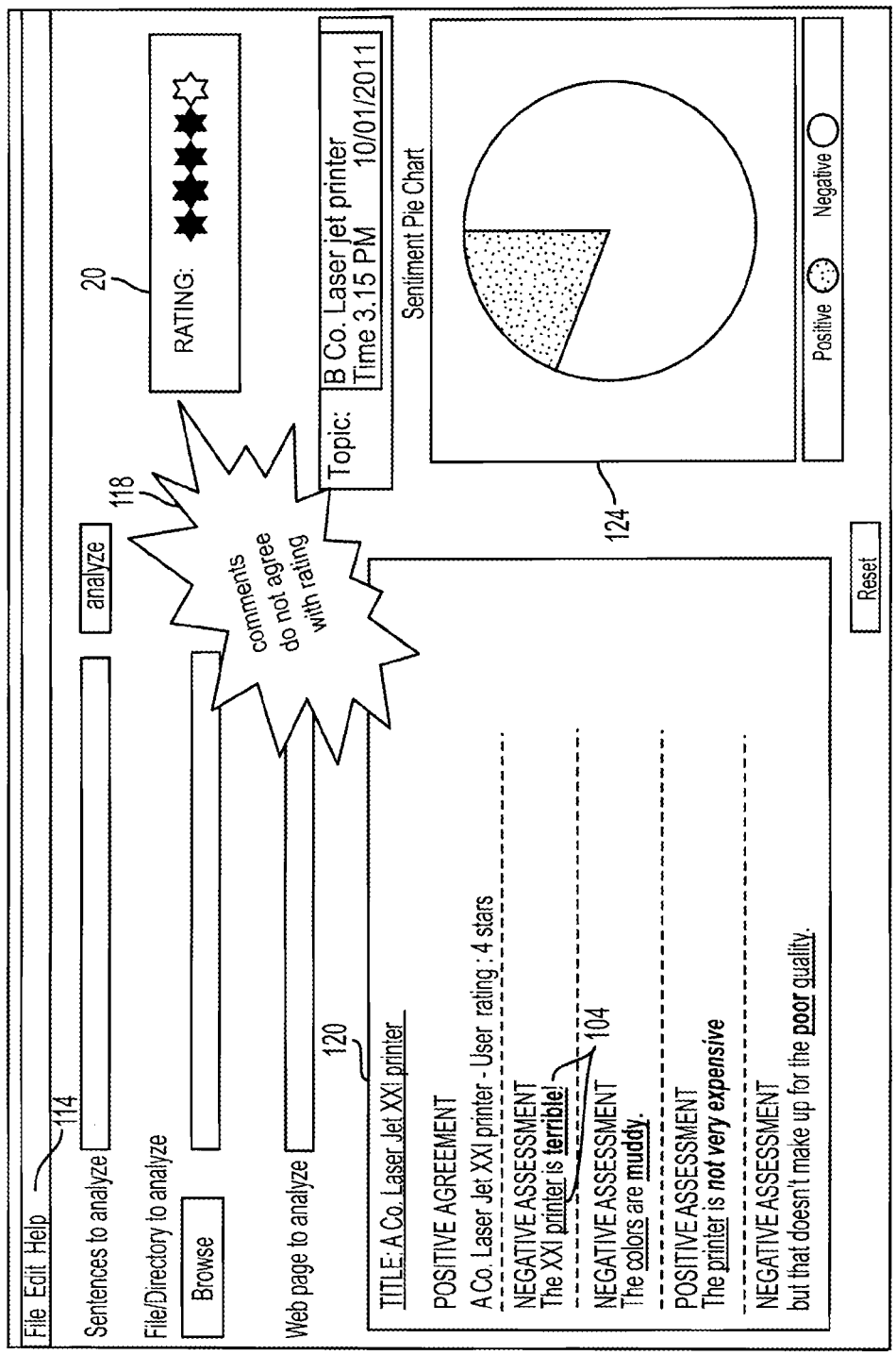
FIG. 5 illustrates a simplified example a review analysis interface showing an exemplary representation of an analysis of a review.
Figure 6:
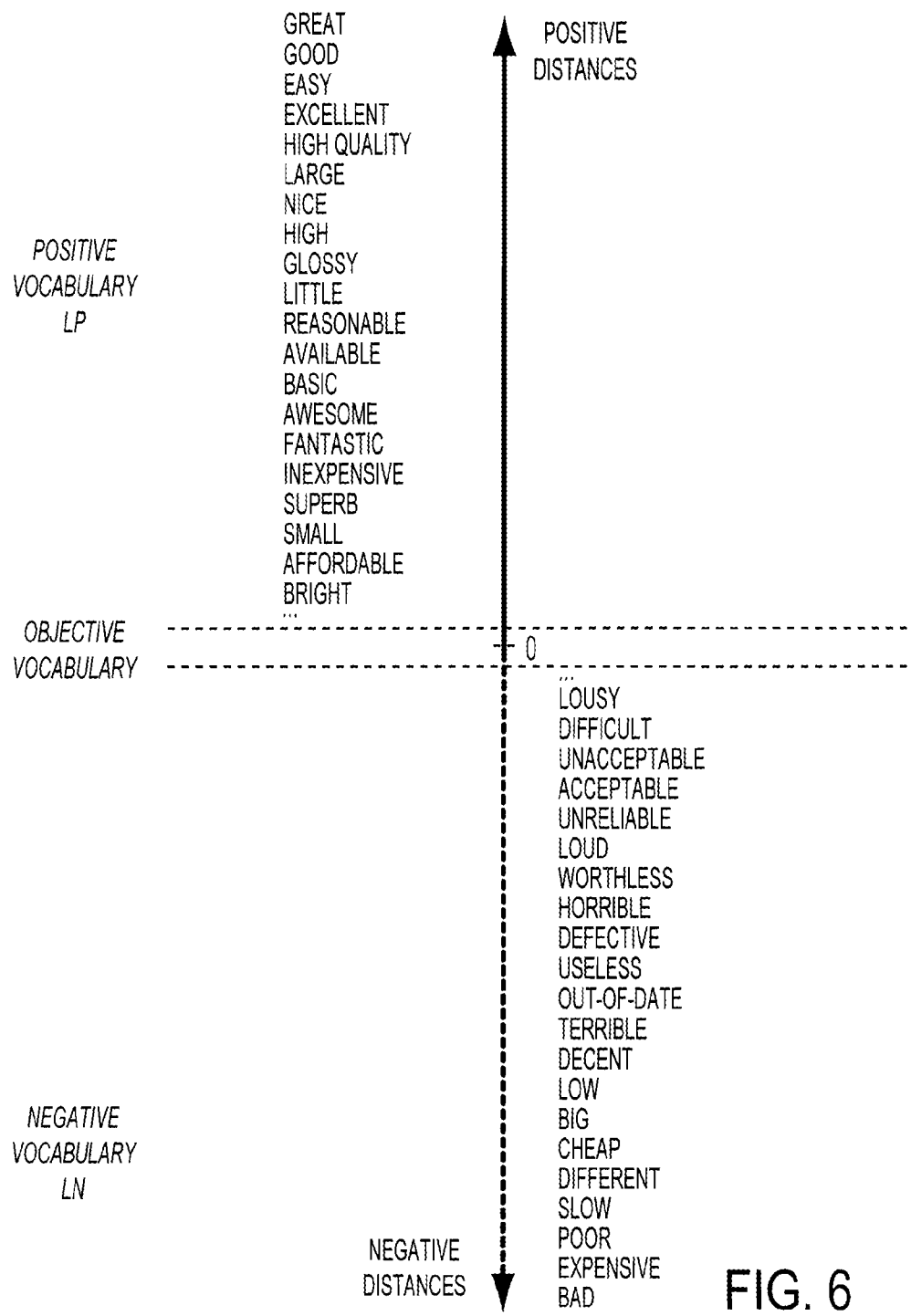
FIG. 6 illustrates a candidate polar vocabulary.

For example, given a review 16' as shown in FIG. 5, where opinion expressions 104 are identified for illustration purposes only, the system may generate a representation 114, as shown in FIG. 5, which identifies the opinion expressions 104 (e.g., by highlighting them) in a list 120. A notice 118 may be provided if the overall sentiment of the review and the author's rating are incoherent (not in agreement by some measure). A graphical representation 124 of the overall sentiment may also be provided. This representation may be useful to an author, as described in copending application Ser. No. 13/052,774, or to a reviewer of a submitted review.

As noted above, in some embodiments, rather than simply identifying the opinion expression instances as positive or negative, i.e., a binary decision, a strength value may be associated with each or some of the instances or with individual terms in them. This may be based on the strength value which is associated with the polar vocabulary used in the instance. The strength value of each instance/term may then be reflected in the representation 114 of the text. Highly polar positive words, for example, could be highlighted in red while quite polar positive words could be highlighted differently, e.g., in pink.

The polar vocabulary and/or evaluation method can thus be used in an opinion mining system which is used to mine opinions about a given topic or product and evaluate related tendencies, e.g., after publication of a review.

The method(s) illustrate in FIG. 3 may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3 can be used to implement the method.

Without intending to limit the scope of the exemplary embodiment, the following examples describe a prototype system for identifying a polar vocabulary and its application on a polar corpus, and the use of the polar vocabulary in an authoring assistant.

EXAMPLES

Example 1

Building a List of Polar Adjectives

A relevant corpus 14 from the Epinions™ website (www.e-pinions.com) was obtained. The reviews posted on the website consist of consumer-generated reviews, buying tips and advice, ratings, price information, and are searchable in a variety of ways from price to product type. From this website, 3700 customer reviews 16 were collected about products for a set of printer brands, which are referred to herein by the generic names A, B, C, and D. The reviews were converted an XML format compatible with the linguistic tools used (based on Xerox's XIP parser). A study of this corpus shows that opinions are expressed on the product itself (i.e., printers, scanners, fax, machines), but also on the characteristics or physical elements of this product. These characteristics can be the quality, the weight, the size, the price, and the like and the related elements can be the cartridges, the ink, and the like. It can also be observed that the effective opinions are mainly expressed by adjectival modifiers or attributes (e.g., the printer s heavy, the cartridges are expensive, a useless feature . . . ).

All nouns presents in the corpus are extracted with the parser. Proper nouns, nouns relative to temporal expressions, unknown words, and urls or email addresses are filtered out. The remaining nouns are then associated with their frequencies in the corpus. In this example, 6372 different nouns (with a total of 473,649 occurrences) are extracted by this method, with frequencies ranging from 7.47% to 0.000211%. TABLE 1 lists the 20 most frequent nouns extracted from the reviews, with their frequencies as determined by their number of occurrences divided by the total occurrences of nouns extracted (473,649), expressed as a percentage:

TABLE 1

| NOUN | FREQUENCY | NOUN | FREQUENCY |
|---|---|---|---|
| printer | 7.47% | computer | 0.95% |
| print | 2.6% | problem | 0.89% |
| paper | 2.58% | software | 0.87% |
| color | 2.06% | fax | 0.81% |
| page | 2.05% | document | 0.76% |
| cartridge | 1.95% | price | 0.75% |
| ink | 1.90% | tray | 0.73% |
| quality | 1.76% | copy | 0.72% |
| photo | 1.72% | text | 0.71% |
| machine | 1.24% | size | 0.65% |
| ... | ... | ... | ... |

TABLE 1 clearly illustrates that the most frequent nouns express the most discussed concepts that related to the main review topic. Consequently, it can be expected that polar adjectives will be found co-occurring with these nouns, either as modifiers ("a tremendous printer"), or attributes ("The quality is terrible"). This list of nouns can be used to extract polarity adjectives.

A threshold on the frequency of 0.1% is established to filter out less frequent nouns. In the example, 160 nouns of the 6372 extracted were selected. By manually examining the list, it can be seen that nouns of lower frequency in the list very rarely refer to a central concept or topic of the review.

To identify positive and negative review sets, all "1 star" reviews (428 reviews) and all "5 star" reviews (1422 reviews) are selected from the corpus 14 (S112), to constitute the positive corpus CP and negative corpus CN, respectively.

All modifiers and attributes in CP and CN that are in syntactic relations which including one of the selected nouns are extracted. Instances of negation are identified, and adjectives in certain objective classes are filtered out (adjectives relating to color, time or age, measures, and country).

Figure 4:
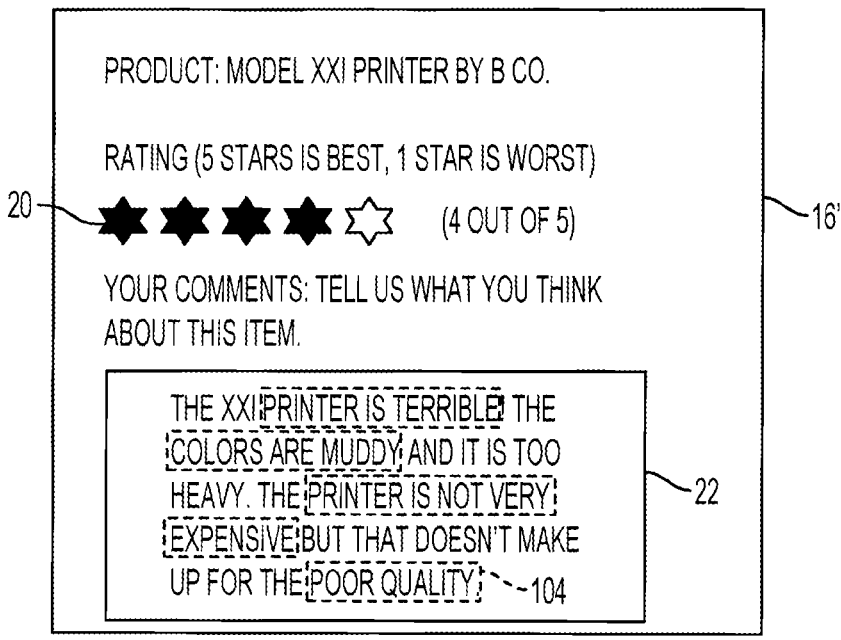
FIG. 4 illustrates an example of an incoherent review.

The two lists LP and LN of adjectives are then constituted, as described above, and a distance Dist(A) is associated with each adjective A of the list 9 computed as described above). A list of 628 different adjectives with distances ranging from +0.056 to −0.054 is obtained. Upon reordering according to the distance, from the most positive to the most negative, a list as illustrated in FIG. 4 was obtained, which shows only the 20 adjectives with the most positive distance (top of the list) and the 20 adjectives with the most negative distance (bottom of the list), for illustration purposes.

This ordered list contains positive and negative vocabulary, and it can be seen that the vocabulary which has the most positive distance and the most negative distance is the most reliable indicator of opinion. The list contain also objective vocabulary (i.e., neutral, not shown), since such adjectives can also be associated with the main concepts (frequent nouns) selected.

The SentiWordNet lexical resource was then used to correct clear errors and filter out some of the most objective vocabulary. As SentiWordNet keeps all WordNet ambiguity, the average positivity, negativity, and objectivity are computed for all adjectives on the list LP, LN, by summing positivity, negativity, and objectivity scores assigned by SentiWordNet to each sense of an adjective and dividing by the number of senses. TABLE 2 lists some examples of the results which can be obtained:

TABLE 2

| WORD | AVERAGE POSITIVITY | AVERAGE NEGATIVITY | AVERAGE OBJECTIVITY |
|---|---|---|---|
| pale-hued | 0 | 0 | 1 |
| apractic | 0.125 | 0.625 | 0.25 |
| disclosed | 0.25 | 0 | 0.75 |
| fatherlike | 0.375 | 0 | 0.625 |
| purplish | 0 | 0 | 1 |
| Viennese | 0 | 0 | 1 |
| overindulgent | 0.125 | 0.25 | 0.625 |
| ... | ... | ... | ... |

These examples are not taken from the exemplary polar vocabulary. This filtering resource tends to flatten the semantic ambiguity, therefore it may be used, for example, only to filter out the adjectives which are considered as mostly objective (i.e., average objectivity >0.75), e.g. "electrical," "medical," . . . , and to detect the potential erroneous cases where a mostly positive term according to SentiWordNet (average positivity >0.75) has a negative distance Dist(A) in the method and the cases where a mostly negative term according to SentiWordNet (Average negativity >0.75) has a positive distance in the method.

In the example, from the initial set of 628 candidates polar adjectives, 128 adjectives were filtered out as being objective, according to SentiWordNet, and 9 adjectives corrected, i.e., their polarity was inverted. The result is an ordered list of 500 adjectives.

The list may be manually evaluated (taking the review's domain and context into account), which is relatively straightforward, due to the ordering of the list.

Based on a human review, a 76.2% precision in the classification of the adjectives' polarity was obtained. The errors (23.8%) can be assigned to the following: 7.8% are objective type adjectives which have not been detected by the SentiWordNet filter, 11.2% are wrongly considered as positive instead of negative, and 4.8% are wrongly considered as negative instead of positive.

Example 2

Evaluation of the Polar Vocabulary

The impact of the discovered list 10 of polar adjectives was evaluated by including them in a polarity lexicon employed by the parser. The system uses the XIP parser to detect opinion expressions from semantic relations extracted from the user's comments and attach a polarity to each instance.

The Epinions™ reviews are structured in that at the end of each review, the user has to explicitly indicate if he or she recommends the product or not. Using this information, the test corpus is filtered in two sub corpora: one containing the recommended products, and the other containing the not recommended products. Setting the threshold of positive opinion instances at 50%, then if a review recommends a product, the system should extract more than 50% of positive opinions relations and if a review do not recommend a product, the system should extract more than 50% negative opinion relations.

From 3730 customer reviews about printer products from the Epinions™ website, about 400 reviews are used to develop the system, and about 3330 are used to evaluate it. In the test corpus of 3337 reviews obtained from the Epinions website, 2517 reviews do recommend the product and 820 do not recommend the product The system was used to classify these reviews. In order to evaluate the impact of the learned polar adjectives, two experiments were performed, one including the polar adjectives in the parser lexicon and the other not, using exactly the same sentiment grammar. The results shown in TABLES 3 and 4 were obtained.

TABLE 3

Experiment without learned adjectives:

| | RECOMMENDED PRODUCT REVIEWS | NOT RECOMMENDED PRODUCT REVIEWS | TOTAL REVIEWS |
|---|---|---|---|
| Number | 2517 | 820 | 3337 |
| Classified as positive by the system (≧50% positive opinions) | 2414 | 263 | 2677 |
| Classified as negative by the system (>50% negative opinions) | 103 | 558 | 661 |
| System accuracy | 96% | 68% | 89% |

TABLE 4

Experiment including learned adjectives

| | RECOMMENDED PRODUCT REVIEWS | NOT RECOMMENDED PRODUCT REVIEWS | TOTAL REVIEWS |
|---|---|---|---|
| Number | 2517 | 820 | 3337 |
| Classified as positive by the system (>=50% positive opinions) | 2440 | 218 | 2658 |
| Classified as negative by the system (>50% negative opinions) | 77 | 602 | 679 |
| System accuracy | 97% | 73.4% | 91% |

There is a global increase of 2% on the total accuracy of the system, and a significant improvement of the accuracy on the "not recommended" reviews.

Example 3

Detection of Incoherent Reviews

From 3730 customer reviews about printer products from the Epinions website, about 400 reviews are used to develop the system, and about 3330 are used to evaluate it. While studying this corpus, it appears that sometimes (about 2% of the reviews in this particular case), the rating or recommendation given by the author is incoherent with the content of the review (e.g., of the type illustrated in FIGS. 4 and 5).

The system provides useful results. In particular, it detects incoherent reviews. For example, in one 4 star review, the opinion review component extracts 63% of negative opinions and only 37% of positive opinions from it, which shows a clear discrepancy between the rating and the content. Looking at the reviews in the test corpus, there are about 2% of incoherent reviews (67 reviews where there is a mismatch between the rating and the content or between the rating and the recommendation). The system detects a discrepancy on 54 of these reviews, which corresponds to 80.6% accuracy.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for generating a polar vocabulary comprising:
    extracting textual content from reviews in a corpus of reviews, each of the reviews including an author's rating;
    identifying a set of frequent nouns from the textual content of the reviews;
    extracting adjectival terms from the textual content of the reviews, each adjectival term being associated in the textual content with one of the frequent nouns; and
    with a processor, generating a polar vocabulary including at least some of the extracted adjectival terms, a polarity measure being associated with each adjectival term in the vocabulary which is based on the ratings of the reviews from which the adjectival term was extracted, the generating of the polar vocabulary comprising identifying a set of positive reviews and a set of negative reviews, based on the ratings, and computing, for an identified adjectival term, a measure of its occurrence in the positive and negative sets of reviews, the polarity measure of the term being based on the measure of occurrence.

2. The method of claim 1, wherein the identifying of the set of frequent nouns comprises:
    parsing the textual content to identify a set of nouns;
    optionally, filtering the identified nouns;
    computing frequencies of the nouns in the corpus of reviews; and
    identifying a set of the most frequent nouns.

3. The method of claim 1, wherein the extracting of the adjectival terms includes parsing the textual content to identify an adjectival term which is in a relation with one of the identified frequent nouns.

4. The method of claim 1, wherein the measure of occurrence is based on a relative frequency of occurrence of the adjectival term in the positive and negative sets of reviews.

5. The method of claim 1, wherein the measure of occurrence considers negation of a term.

6. The method of claim 1, wherein the polarity measure is selected from positive and negative polarity.

7. The method of claim 1, further comprising filtering the identified adjectival terms to remove objective terms.

8. The method of claim 7, wherein the filtering of the identified adjectival terms to remove objective terms includes retrieving objectivity scores for each context of one of the adjectival terms in a set of contexts recognized in a lexical resource and removing the adjectival term if its objectivity score meets or exceeds a threshold value.

9. The method of claim 1, further comprising using a lexical resource to identify an error in the assignment of polarity to a term and changing the polarity of that term.

10. The method of claim 1, wherein the rating is intended to reflect an author's opinion of an item which is the subject of the textual content.

11. The method of claim 1, wherein the rating is selected from the group consisting of a ratio, a percentage, a score, a textual comment selected from a finite set of textual comments, and combinations thereof.

12. The method of claim 1, further comprising inputting the polar vocabulary to an opinion mining system.

13. The method of claim 1, further comprising, obtaining the corpus of reviews from an opinion website by filtering the reviews on the website to identify reviews relating to a selected class of goods or services.

14. The method of claim 13, wherein the class of goods relates to printers.

15. The method of claim 1, wherein the extracting textual content from reviews in a corpus of reviews comprises extracting textual content from at least 1000 reviews.

16. The method of claim 1, further comprising:
identifying a first list of candidate positive polar adjectives containing: a) all adjectives extracted from the set of positive reviews which are not negated and b) all adjectives extracted from the set of negative reviews which are negated;
identifying second list of candidate negative polar adjectives which contains: c) all adjectives from the set of negative reviews which are not negated, and all adjectives from the set of positive reviews which are negated; and
wherein the polarity measure for an identified adjectival term A is computed as a distance:

$$\text{Dist}(A) = FP(A) - FN(A),$$

where FP(A) is a frequency of the identified adjectival term in the first list, and FN(A) is the frequency of the identified adjectival term in the second list.

17. A system for performing the method of claim 1 comprising memory which stores instructions for performing the method and a processor in communication with the memory for executing the instructions.

18. An opinion mining system comprising:
memory which stores a polar vocabulary generated by the method of claim 1;
memory, which stores an opinion mining component for extracting an opinion from input text using the polar vocabulary; and
a processor which implements the opinion mining component.

19. A computer program product comprising a non-transitory recording medium containing instructions, which when executed on a computer causes the computer to perform the method of claim 1.

20. A system for generating a polar vocabulary comprising:
a parser which extracts textual content from reviews in a corpus of reviews, parses the corpus of reviews to identify nouns from the textual content of the reviews, from which a set of frequent nouns is identified by associating the identified nouns with respective frequencies in the corpus of reviews, based on a number of their occurrences, and extracts adjectival terms from the textual content of the reviews, the adjectival terms being extracted with a parser rule which identifies an adjectival term which is in a relation with one of the frequent nouns; and
a vocabulary generator which generates a polar vocabulary comprising adjectival terms identified by the parser, a polarity measure being associated with each adjectival term in the vocabulary which is based on the ratings of the reviews from which the adjectival term was extracted;
a processor which implements the parser and vocabulary generator.

21. The system of claim 20, further comprising a filtering component for removing adjectival terms which are determined to be objective.

22. A method comprising:
retrieving a corpus of reviews, each of the reviews including an author-generated rating of an item and textual content comprising the author's comments about the item;
based on the rating, assigning each review to one of a set of sub-corpora;
identifying frequent nouns from the textual content of the reviews, comprising parsing the corpus of reviews to identify nouns from the textual content of the reviews and identifying a set of frequent nouns based on respective frequencies of the identified nouns in the corpus of reviews;
extracting a set of adjectival terms from the textual content of the reviews, each adjectival term being associated in the textual content with one of the frequent nouns;
computing, for each of the adjectival terms in the set, a measure of the occurrences of the adjectival term in each of the sub-corpora; and
generating a polar vocabulary including at least some of the extracted adjectival terms, a polarity measure being associated with each adjectival term in the vocabulary which is based on the measure of occurrences of the term in each of the sub-corpora.

23. The method of claim 22, further comprising incorporating the polar vocabulary into an opinion mining system.

* * * * *